(12) United States Patent
Bietry et al.

(10) Patent No.: US 7,573,654 B2
(45) Date of Patent: Aug. 11, 2009

(54) DUAL FOCAL LENGTH LENS SYSTEM

(75) Inventors: Joseph R. Bietry, Rochester, NY (US);
John N. Border, Walworth, NY (US);
Scott C. Cahall, Fairport, NY (US);
John D. Griffith, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/945,445

(22) Filed: Nov. 27, 2007

(65) Prior Publication Data

US 2009/0135494 A1     May 28, 2009

(51) Int. Cl.
*G02B 17/00*     (2006.01)

(52) U.S. Cl. ........................... 359/726; 359/736

(58) Field of Classification Search .......... 359/726–736
See application file for complete search history.

(56) References Cited

U.S. PATENT DOCUMENTS

| | | | |
|---|---|---|---|
| 4,354,742 A * | 10/1982 | Abel et al. ................ 359/729 |
| 4,439,012 A | 3/1984 | Christy | |
| 4,993,818 A | 2/1991 | Cook | |
| 5,051,830 A | 9/1991 | von Hoessle | |
| 5,114,238 A | 5/1992 | Sigler | |
| 5,144,476 A | 9/1992 | Kebo | |
| 5,159,495 A | 10/1992 | Hamblen | |
| 5,172,235 A | 12/1992 | Wilm | |
| 6,169,637 B1 | 1/2001 | Tsunashima | |
| 6,333,811 B1 | 12/2001 | Tatian | |
| 6,549,332 B2 | 4/2003 | Kimura | |
| 6,636,356 B2 | 10/2003 | Takeyama | |
| 6,728,044 B2 | 4/2004 | Akiyama | |
| 6,870,690 B1 | 3/2005 | Lawson | |
| 7,049,597 B2 | 5/2006 | Bodkin | |
| 7,119,969 B1 | 10/2006 | Amon | |
| 2002/0097505 A1 | 7/2002 | DeLong | |

FOREIGN PATENT DOCUMENTS

| EP | 1099969 | 12/2006 |
|---|---|---|
| GB | 2 107 897 | 5/1983 |
| JP | 2004-247947 | 9/2004 |

OTHER PUBLICATIONS

U.S. Appl. No. 11/461,574, filed Aug. 1, 2006, Border et al.

* cited by examiner

*Primary Examiner*—William C Choi
(74) *Attorney, Agent, or Firm*—William R. Zimmerli

(57) ABSTRACT

A dual focal length optical system includes a first optical system and a second optical system. The first optical system is positioned along an optical path and includes an optical structure having an object side surface and an image side surface. The first optical system also includes a first surface of an intermediate reflective element located between the object side surface and the image side surface of the optical structure as viewed along the optical path. The first optical system has a first focal length. The second optical system shares a portion of the same optical path and includes a second surface of the same intermediate reflective element as that of the first optical system. The second optical system has a second focal length. The first focal length of the first optical system is longer than the second focal length of the second optical system.

20 Claims, 7 Drawing Sheets

DUAL FOCAL LENGTH LENS SYSTEM

FIELD OF THE INVENTION

This invention relates generally to the field of reflective optical systems, and in particular to optical systems suitable for use in compact imaging systems.

BACKGROUND OF THE INVENTION

Optical systems that combine reflective optics with refractive optics are known. For example, U.S. Pat. No. 7,049,597, issued to Bodkin, and U.S. Pat. No. 7,119,969, issued to Amon, disclose a dual optical path with reflective and refractive elements for use in a dual spectrum optical system. Each optical system includes one optical system for visible imaging and another optical system for hyperspectral imaging. A beam splitter is used to form two optical paths.

U.S. Pat. No. 5,051,830, issued to Von Hoessle, discloses a refractive lens with inner and outer zones is disclosed. Light from the outer zone travels to a reflective lens which focuses the light onto a first sensor. Light from the inner zone is focused onto a second sensor that is located in a back to back configuration with the first sensor. A single electronic system is used to support both imaging systems so that only one of the imaging systems can be used at a time. The positioning of the two sensors is designed to minimize weight in a guided missile application. The shorter focal length imaging system is provided for general guidance of the missile to the target. The longer focal length imaging system is provided for more accurate guidance of the missile during the final stage of guidance of the missile to the target.

U.S. Pat. No. 6,870,690, issued to Lawson, discloses a lens in which an outer portion of the lens is designed for one spectral band and an inner portion of the lens is designed for another spectral band. U.S. Pat. No. 5,172,235, issued to Wilm, discloses two lenses that are focused onto one sensor. Complimentary zone filters enable the two images from the two lenses to overlay one another to produce a composite image with different areas of resolution.

There is still a need, however, to provide a compact imaging system incorporating a dual focal length lens system that includes two independent lens systems that simultaneously provide different focal length images of the same scene or object.

SUMMARY OF THE INVENTION

According to one aspect of the invention, a dual focal length optical system includes a first optical system and a second optical system. The first optical system is positioned along an optical axis and includes an optical structure having an object side surface and an image side surface. The object side surface and the image side surface include a refractive surface portion and a reflective surface portion. The first optical system has a focal length. The second optical system is positioned on the same optical axis and has a focal length. The focal length of the first optical system is longer than the focal length of the second optical system.

According to another aspect of the invention, a dual focal length optical system includes a first optical system and a second optical system. The first optical system is positioned along an optical path and includes an optical structure having an object side surface and an image side surface. The first optical system also includes a first surface of an intermediate reflective element located between the object side surface and the image side surface of the optical structure as viewed along the optical path. The first optical system has a first focal length. The second optical system shares a portion of the same optical path and includes a second surface of the same intermediate reflective element as that of the first optical system. The second optical system has a second focal length. The first focal length of the first optical system is longer than the second focal length of the second optical system.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
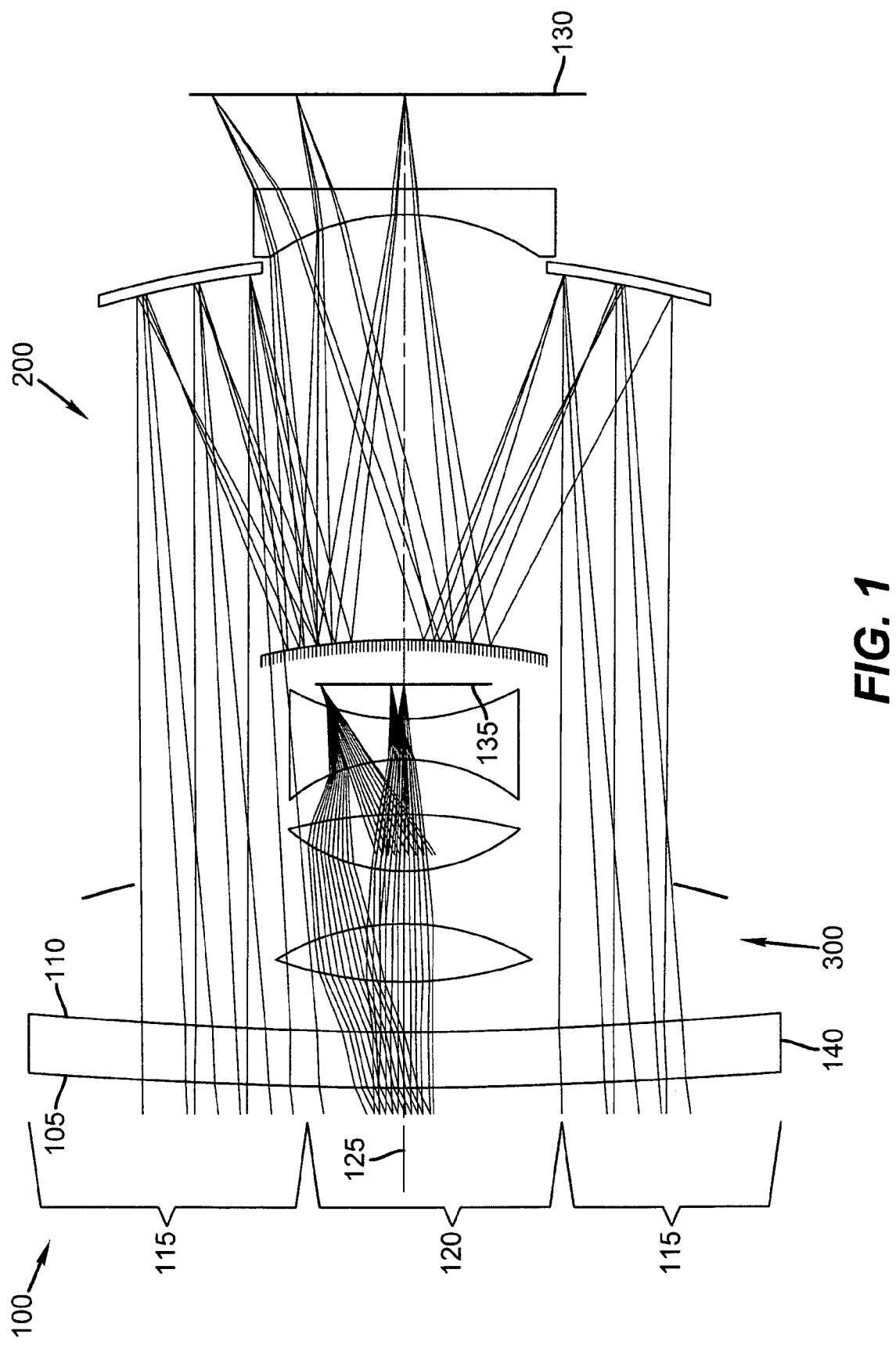
FIG. 1 is a schematic diagram showing a ray trace of light propagating through a first example embodiment of the invention.

Referring to FIG. 1, a schematic drawing showing a ray trace of light propagating through a first embodiment of a dual focal length lens system 100 is shown. Dual focal length lens systems 100 includes a first (for example, a telephoto) optical system 200 and a second (for example, a wide angle) optical system 300. The optical surfaces (described in more detail with reference to FIG. 2) of first optical system 200 define a catadioptric optical system in which optical system 200 includes both refractive and reflective optical surfaces having optical power. The optical surfaces (described in more detail with reference to FIG. 2) of second optical system 300 define a dioptric optical system in which optical system 300 includes refractive optical surfaces having optical power.

First optical system 200 and second optical system 300 are positioned along an optical axis 125 and share optical surfaces of an optical element(s). Surfaces 105 and 110 define a lens element 140 having weak refracting optical power, commonly referred to as a corrector plate, that is used for both first optical system 200 and second optical system 300. Different portions of lens element 140 are used for each lens system with first optical system 200 using an outer annular region 115 and second optical system 300 using a central region 120.

Surface 105 of lens element 140 is aspheric and surface 110 of lens element 140 is spherical. However, either or both surfaces 105 and 110 can be aspheric to help correct aberrations. Alternatively, surfaces 105 and 110 can be plano to act as a cover window to protect the remaining optical system from contamination.

First optical system 200, having a focal length, is positioned along an optical path or optical axis 125. Second optical system 300, having a focal length, is positioned along the same optical path 125. The focal length (a first focal length) of first optical system 200 is longer than the focal length (a second focal length) of second optical system 300. First optical system 200 directs light to an image sensor 130 while second optical system 300 directs light to an image sensor 135.

Figure 2:
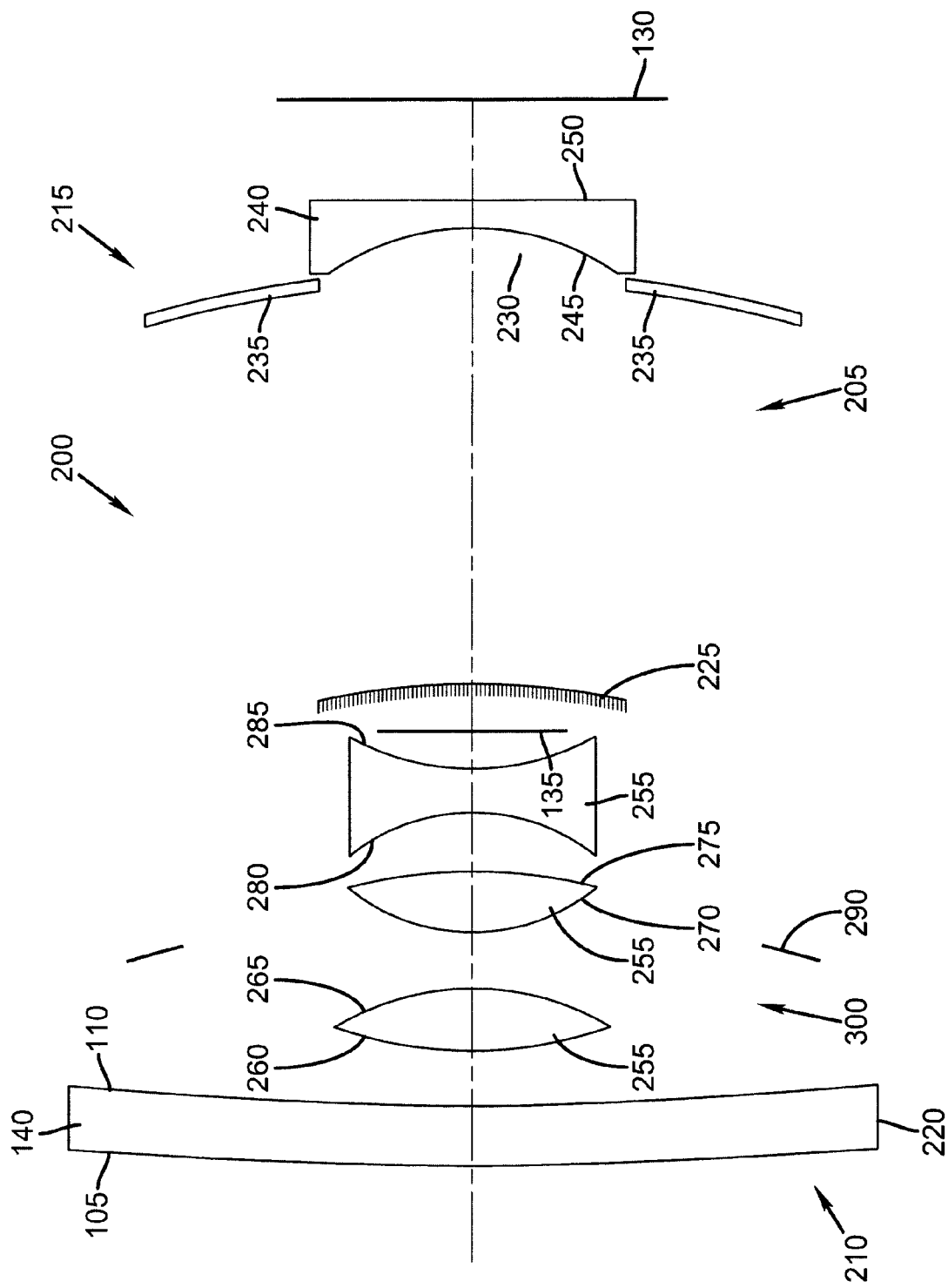
FIG. 2 is a schematic diagram of the optical components of the first example embodiment of the invention.

Referring to FIG. 2, first optical system 200 includes an optical structure 205 having an object side surface 210 and an image side surface 215. Object side surface 210 includes a refractive surface portion 220 and a reflective surface portion 225. Image side surface 215 includes a refractive surface portion 230 and a reflective surface portion 235.

Reflective surface portion 235 of image side surface 215 of optical structure 205 has optical power and is aspheric. Reflective surface portion 225 of object side surface 210 of optical structure 205 also has optical power and is spherical. However, reflective surface portion 225 can be aspheric. The majority of the optical power for first optical system 200 is present in reflective surface 235 and 225. As surfaces 235 and 225 are reflective these surfaces do not introduce chromatic aberration into optical system 200. First optical system 200 includes an aperture 290.

The space between surfaces 225 and 235 can be filled with air or a refractive material (described in more detail with reference to FIG. 3). When this space is filled with a refractive material, the dispersion of the material may introduce some chromatic aberration. When this happens, a refractive optical element 240 having surfaces 245 and 250 positioned between image sensor 130 and optical structure 205 can be used to correct chromatic aberration as well as field aberration if field aberration is present.

As shown in FIG. 2, refractive surface portion 230 of image side surface 215 of optical structure 205 includes one or both of surfaces 245 and 250 of optical element 240. However, when the space between surfaces 225 and 235 is filled with a refractive material (see FIG. 3), refractive surface portion 230 of image side surface 215 of optical structure 205 can be formed, for example, by molding a radius of curvature, from the material itself.

As shown in FIG. 2, refractive surface portion 220 of object side surface 210 of optical structure 205 includes one or both surfaces 105 and 110 of lens element 140. Accordingly, the optical power of object side surface 210 of optical structure 205 is less than the optical power of image side surface 215 of optical structure 205. Alternatively, object side surface 210 of optical structure 205 can include another surface(s). For example, when lens element 140 is a plano plate, object side surface 210 can be a surface of another lens element or an object side surface 330 of the material used to fill the space between surfaces 225 and 235 (see FIG. 3).

Still referring to FIG. 2 and back to FIG. 1, different portions of lens element 140 are used for each lens system with first optical system 200 using an outer annular region 115 and second optical system 300 using a central region 120. In this sense, object side surface 210 of optical structure 205 includes a first refractive surface portion 115 and a second refractive surface portion 120 with the second refractive surface portion 120 being associated with second optical system 300 and the first refractive surface portion 115 being associated with the first optical system 200. As shown in FIGS. 1 and 2, the first refractive surface portion 115 and the second refractive surface portion 120 of object side surface 210 of optical structure 205 form a continuous surface but this does not always have to be the case. Additionally, the first refractive surface portion 115 and the second refractive surface portion 120 of object side surface 210 of optical structure 205 have the same radius of curvature. However, refractive surface portions 115 and 120 can have different radii of curvature.

Table 1A describes one specific configuration of first lens system 200 of the first example embodiment of the invention. In this configuration, lens system 200 is a telephoto lens system. However, it is recognized that other configurations are permitted. Typically, these other configurations depend on the specific application contemplated for first lens system 200 of dual focal length lens system 100.

TABLE 1A

| Surface Number | Surface Type | Radius of Curvature | Thickness | Material |
|---|---|---|---|---|
| 105 | Asphere | 57.8494675050496 | 1 | 531200.560000 |
| 110 | Sphere | 59.625042170115 | 14 | |
| 235 | Asphere | −20.2112695127046 | −6.797583 | |
| 225 | Sphere | −10.0720729924657 | 7.703927 | |
| 245 | Sphere | −4.07618390798256 | 0.5 | 531200.560000 |
| 250 | Sphere | −155.495425161355 | 1.7 | |

ASPHERIC CONSTANTS $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

| ASPHERIC | CURV | K | A |
|---|---|---|---|
| A(1) | 0.01728624 | 0.0 | −4.19841E−05 |
| A(3) | −0.04947735 | 0.261217 | 0.00E+00 |

| ASPHERIC | B | C | D |
|---|---|---|---|
| A(1) | −5.13601E−07 | 1.09172E−08 | −1.21494E−10 |
| A(3) | 0.00E+00 | 0.00E+00 | 0.00E+00 |

Still referring to FIG. 2, second optical system 300 shares surfaces 105 and 110 of optical element 140 with first optical system 200. After passing through optical elements 140, second optical system 300 directs light to image sensor 135 through one or more additional lenses 255. As shown in FIG. 2, these lenses include a biconvex lens having surfaces 260, 265; a biconvex lens having surfaces 270, 275; and a biconcave lens having surfaces 280, 285. Alternatively, second optical system 300 can have more or less lenses than the number of lenses shown in FIG. 2.

The majority, if not all, of the optical power for optical system 300 is contained in surfaces 260 through 285. Lenses 255 form a three element lens group having a +, +, − optical power, but other configurations are just as viable. Surfaces 260 through 285 are spherical, however, any of these optical surfaces can have aspheres for aberration control.

Table 1B describes one specific configuration of second lens system 300 of the first example embodiment of the invention. In this configuration, lens system 300 is a wide angle lens system. However, it is recognized that other configurations are permitted. Typically, these other configurations depend on the specific application contemplated for first lens system 300 of dual focal length lens system 100.

TABLE 1B

| Surface Number | Surface Type | Radius of Curvature | Thickness | Material |
|---|---|---|---|---|
| 105 | Asphere | 57.8494675050496 | 1 | 531200.560000 |
| 110 | Sphere | 59.625042170115 | 1.00000 | |
| 260 | Sphere | 7.60261 | 1.00000 | Schott NFK5 |
| 265 | Sphere | −4.49456 | 1.00000 | |
| 270 | Sphere | 3.12733 | 1.00000 | Schott NFK5 |
| 275 | Sphere | −7.67950 | 1.00000 | |
| 280 | Sphere | −3.10732 | 0.75000 | Schott SF6 |
| 285 | Sphere | 4.59180 | 0.61382 | |

ASPHERIC CONSTANTS $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

| ASPHERIC | CURV | K | A |
|---|---|---|---|
| A(1) | 0.01728624 | 0.0 | −4.19841E−05 |

| ASPHERIC | B | C | D |
|---|---|---|---|
| A(1) | −5.13601E−07 | 1.09172E−08 | −1.21494E−10 |

Referring back to FIGS. 1 and 2, at least one of the first focal length of first optical system 200 and the second focal length of second optical system 300 is a fixed focal length. However, it is contemplated that an additional optical element(s) can be positioned between either or both of the image sensor 130 and first optical system 200 and image sensor 135 and second optical system 300 that is moveable in order to affect a change in focal length, focus, or both. This can be accomplished using conventional techniques for moving one or more optical elements. Alternatively, one or both of image sensor 130 and image sensor 135 can be moveable along its associated optical path to affect a change in focus. Movement of the image sensor(s) is accomplished using conventional techniques. In another alternative embodiment, first optical system 200 or second optical system 300 can be moved relative to their respective image sensors 130 and 135 to affect a change in focus. Again, movement is accomplished using conventional techniques.

A controller can be provided and configured to perform a digital zooming function using both the images produced by first optical system 200 and second optical system 300 of dual focal length lens system 100. Digital zooming can be accomplished using techniques like the one described in U.S. patent application Ser. No. 11/461,574 filed Aug. 1, 2006 Border et al, the disclosure of which is incorporated by reference herein.

Figure 3:
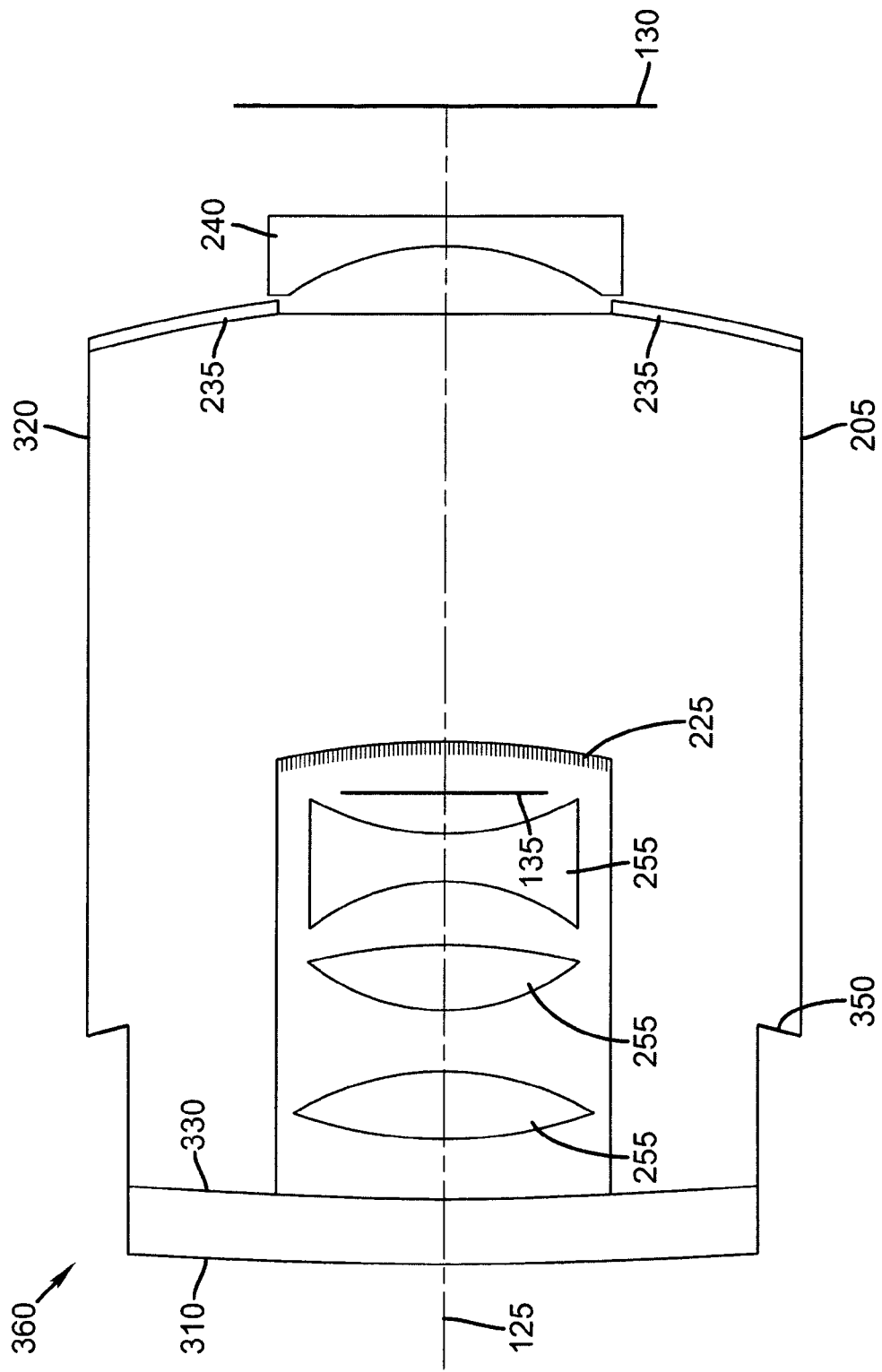
FIG. 3 is a schematic drawing showing an example implementation of the first example embodiment of the invention.

Referring to FIG. 3 and back to FIG. 2, an example implementation 360 of dual focal length lens system 100 is shown. Optical structure 205 is a solid material element that includes two pieces 310, 320 cemented together around lenses 255 and image sensor 135. Suitable materials include low dispersion materials like acrylic plastics, cyclo olefin polymers (cop), for example, Zeonex, which is commercially available from the Zeon Corporation, Tokyo, Japan. Piece 310 includes element 140 which serves as refractive surface portion 220 of object side surface 210. Piece 320 includes reflective surface portion 225 of object side surface 210 and reflective surface portion 235 of image side surface 215. In FIG. 3, the material surface in the middle of reflective surface portion 235 of image side surface 215 is plano, so refractive optical element 240 serves as the refractive surface portion 230 of image side surface 215. Example implementation 360 of dual focal length lens system 100 also includes a light blocking surface 350 on piece 320 that forms aperture 290. In FIG. 3, optical elements 255 are the same as those optical lenses described with reference to FIG. 2. Image sensor 130 is also shown.

Figure 4:
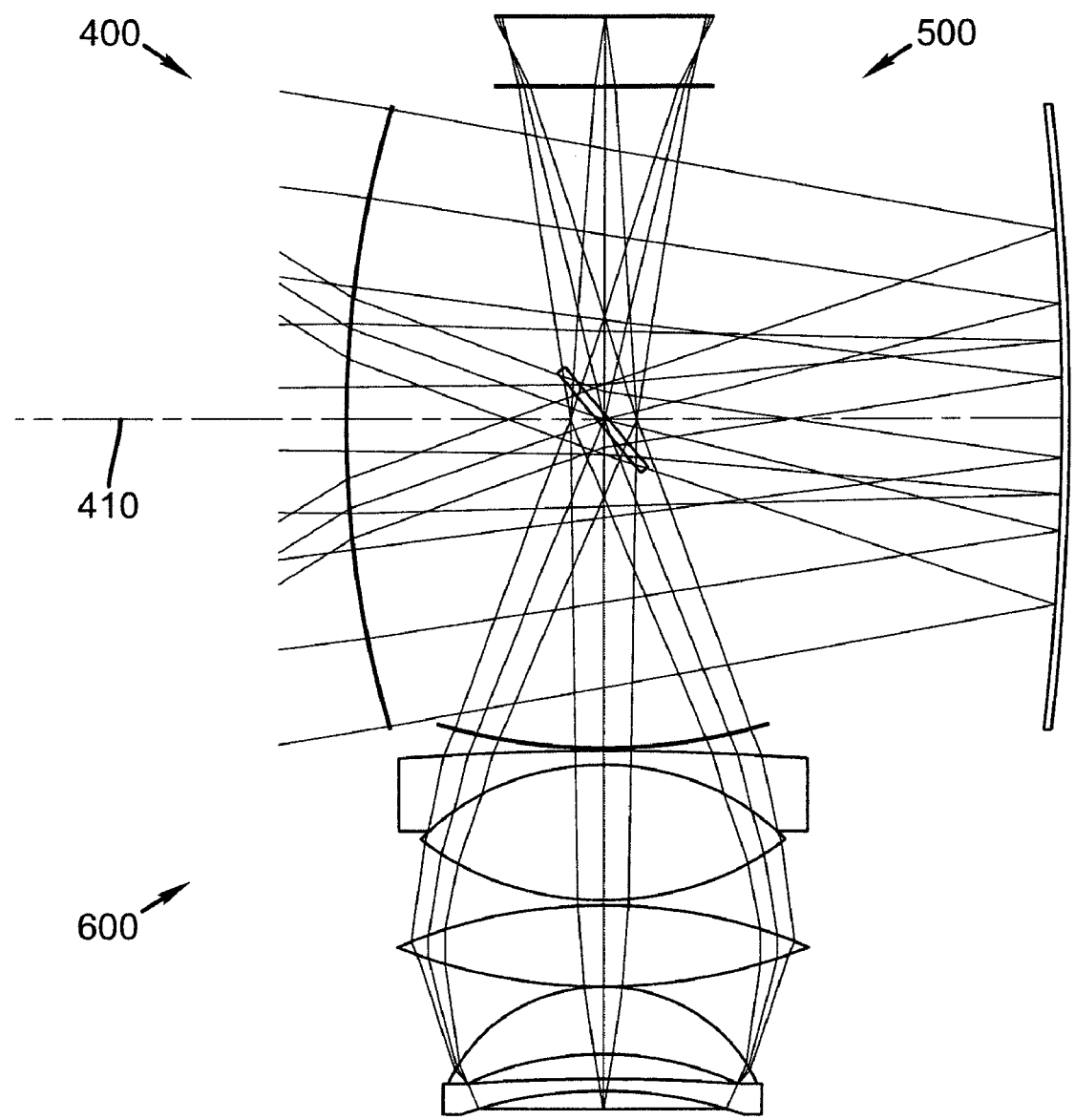
FIG. 4 is a schematic drawing showing a ray trace of light propagating through a second example embodiment of the invention.

Referring to FIG. 4, a schematic drawing showing a ray trace of light propagating through a second embodiment of a dual focal length lens system 400 is shown. Dual focal length lens system 400 includes a first (for example, a telephoto) optical system 500 and a second (for example, a wide angle) optical system 600. The optical surfaces (described in more detail with reference to FIG. 5) of first optical system 500 define a catadioptric optical system in which optical system 500 includes both refractive and reflective optical surfaces having optical power. The optical surfaces (described in more detail with reference to FIG. 6) of second optical system 600 define a dioptric optical system in which optical system 600 includes refractive optical surfaces having optical power. First optical system 500 and second optical system 600 share a portion of an optical axis 410, some optical surfaces and optical elements.

First optical system 500, having a first focal length, is positioned along an optical path or optical axis. Second optical system 600, having a second focal length, shares a portion of the same optical path. The optical path is depicted using the ray trace of light propagating through optical system 400. The first focal length of first optical system 500 is longer than the second focal length of second optical system 600.

Figure 5:
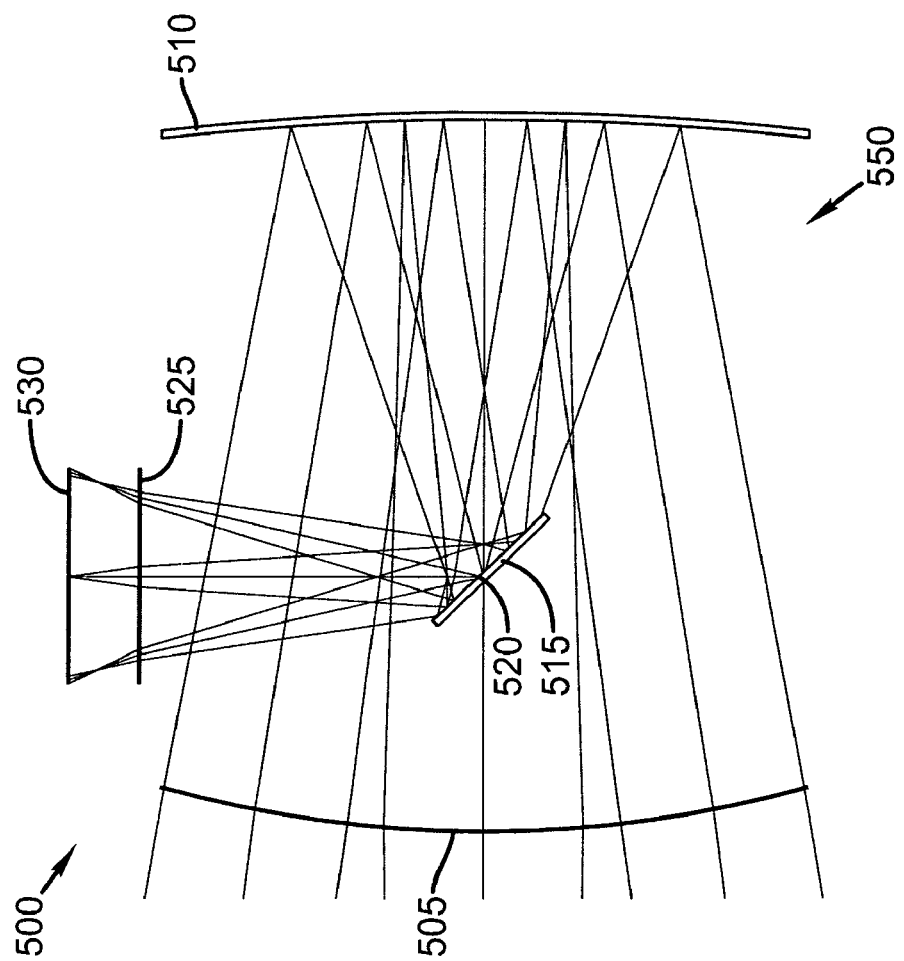
FIG. 5 is a schematic drawing showing a ray trace of light propagating through a portion of the second example embodiment of the invention shown in FIG. 4.

Referring to FIG. 5, first optical system 500 includes an optical structure 550 that includes an object side surface 505 and an image side surface 510 as viewed along the optical path (depicted by the ray trace of light propagating through optical system 500). An intermediate optical element 515 is located between object side surface 505 and image side surface 510 of optical structure 550. First optical system 500 also includes a first surface 520 of intermediate element 515.

Object side surface 505 has some positive optical power which helps to reduce the overall length of first optical system 500. Object side surface 505 is aspheric, however, surface 505 can also be spherical. Image side surface 510 is a reflective surface that provides a greater amount of optical power (when compared to surface 505) and does so without adding chromatic aberration because it is reflective. Image side surface 510 can also be aspheric. Surface 520 of intermediate element 515 is a plano reflecting surface, for example, a mirror surface, with no optical power that redirects or folds the optical path or axis of first optical system 500.

As shown in FIG. 5, first optical system 500 includes a second intermediate optical element with intermediate optical element 515 being a first intermediate optical element. Intermediate element includes refractive surface 525 and is positioned along a portion of the optical path that is not shared by second optical system 600. Surface 525 is included in optical structure 550. However, optical surface 525 can be a surface of an intermediate optical element that is not part of optical structure 550. First optical system 500 directs light to an image sensor 530. Although not shown in FIG. 5, an additional optical element(s) can be positioned between image sensor 530 and first optical system 500 like the optical elements positioned between image sensor 675 and second optical system 600 (described with reference to FIG. 6). In FIG. 5, surface 525 is plano. However, surface 525 can have optical power and optionally be aspheric in order to be used as a field correction surface, a way to control lateral color, or both.

Table 2A describes one specific configuration of first lens system 500 of the second example embodiment of the invention. In this configuration, lens system 500 is a telephoto lens system. However, it is recognized that other configurations are permitted. Typically, these other configurations depend on the specific application contemplated for first lens system 500 of dual focal length lens system 400.

TABLE 2A

| Surface Number | Surface Type | Radius of Curvature | Thickness | Material |
|---|---|---|---|---|
| 505 | Asphere | 28 | 17 | 531200.560000 |
| 510 | Sphere | −65 | −11 | 531200.560000 |
| 520 (515) | Sphere | 1e+018 | 8 | 531200.560000 |
| 525 | Sphere | 1e+018 | 1.62803743654473 | |

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K | A |
|---|---|---|---|
| A(1) | 0.03571429 | 0.261217 | 0.0E+00 |

| ASPHERIC | B | C | D |
|---|---|---|---|
| A(1) | 0.0E+00 | 0.0E+00 | 0.0E+00 |

Figure 6:
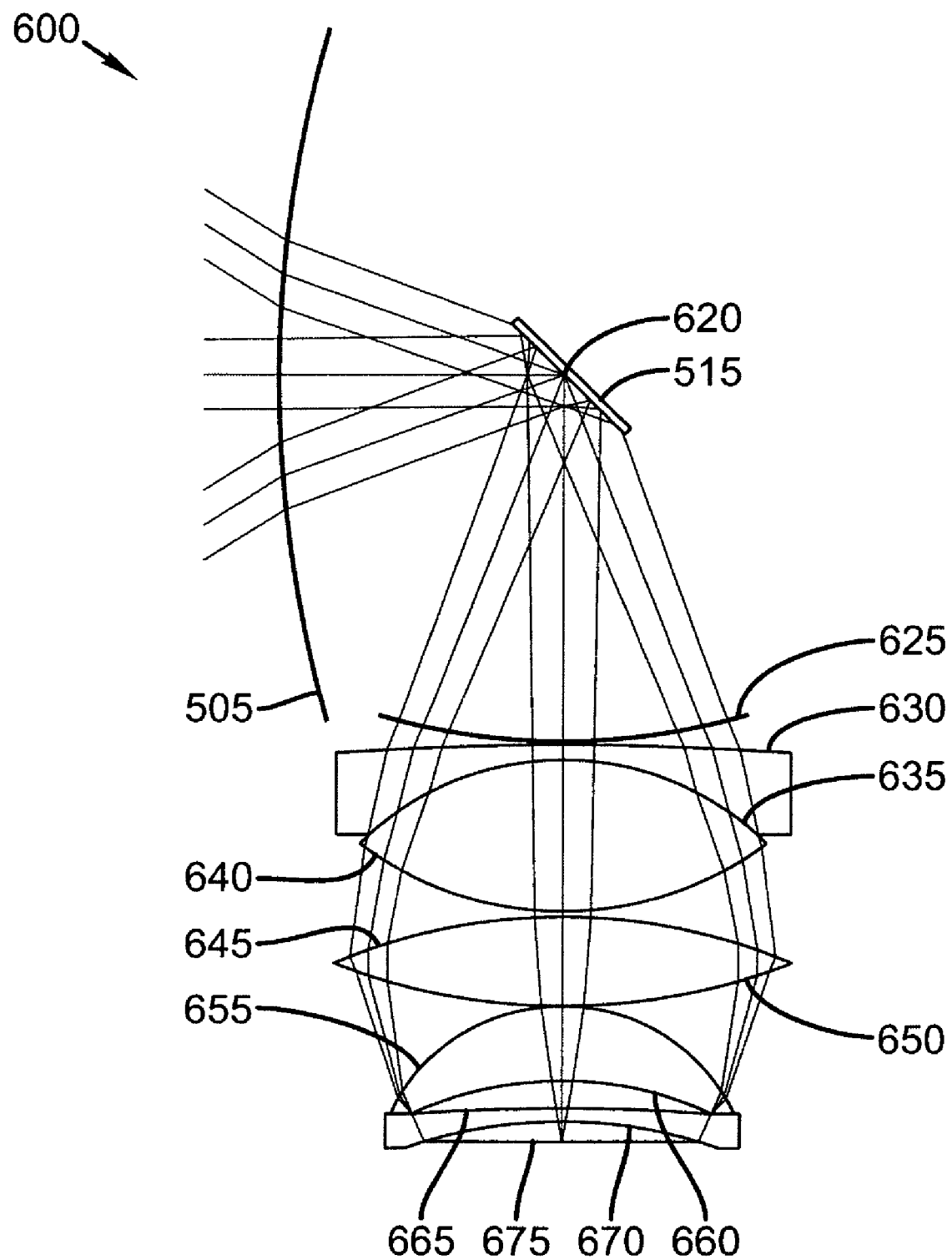
FIG. 6 is a schematic drawing showing a ray trace of the light propagating through a portion of the second example embodiment of the invention shown in FIG. 4.

Referring to FIG. 6, second optical system 600 shares surface 505 with first optical system 500. Second optical system 600 includes a second surface 620 of intermediate element 515. In this instance, second surface 620 is opposite first surface 520. Second surface 620 of intermediate element 515 is a plano reflecting surface with no optical power that redirects the optical path or axis of second optical system 600.

When designing dual focal length lens system 400, second surface 620 can be designated as the aperture stop of second optical system 600 in order to reduce or minimize the physical space requirements of surface 620 (and intermediate element 515). Similarly, first surface 520 on intermediate element 515 can be designated as the aperture stop of first optical system 500.

Second optical system 600 includes optical surface 625 which is spherical and has optical power. Surface 625 can be aspheric. Optical surface 625 is included in optical structure 550. In this sense, optical surface 625 is a second image side surface of optical structure 550 with image side surface 510 of optical structure 550 being a first image side surface of optical structure 550. However, it should noted that optical surface 625 is refractive whereas image side surface 510 is reflective. Optical surface 625 is positioned along a portion of the optical path that is not shared by first optical system 500. Alternatively, optical surface 625 can be a surface of an optical element that is not part of optical structure 550.

After passing through optical surface 625, second optical system 600 directs light to an image sensor 675 through one or more additional lenses. As shown in FIG. 6, these lenses include a doublet having surfaces 630, 635, 640; a biconvex lens having surfaces 645, 650; and first and second meniscus lenses having surfaces 655, 660 and 665,670, respectively. First and second meniscus lenses are both concave on their image sensor 675 side. Alternatively, second optical system 600 can have more or less lenses than the number of lenses shown in FIG. 6.

Table 2B describes one specific configuration of second lens system 600 of the second example embodiment of the invention. In this configuration, lens system 600 is a wide angle lens system. However, it is recognized that other configurations are permitted. Typically, these other configurations depend on the specific application contemplated for first lens system 600 of dual focal length lens system 400.

TABLE 2B

| Surface Number | Surface Type | Radius of Curvature | Thickness | Material |
|---|---|---|---|---|
| 505 | Asphere | 28 | 6 | 531200.560000 |
| 620(515) | Sphere | 1e+018 | −8 | 531200.560000 |
| 625 | Sphere | 15.7235349193283 | −0.1 | |
| 630 | Sphere | −72.4903253521872 | −0.320000000000003 | 728300.283000 |
| 635 | Sphere | −6.348244432915 | −3.23214999780346 | 620400.603000 |
| 640 | Sphere | 7.1739813793011 | −0.0999999999999989 | |
| 645 | Sphere | −11.2953941892583 | −1.89457378858138 | 568700.631000 |
| 650 | Sphere | 15.4906964613072 | −0.0999999999999999 | |
| 655 | Sphere | −4.07305249656168 | −1.65033497854948 | 692300.547000 |
| 660 | Sphere | −8.68370524690205 | −0.555762452403168 | |
| 665 | Sphere | −73.1325877974812 | −0.32 | 728300.283000 |
| 670 | Sphere | −10.4032594561083 | −0.42066077910744 | |

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K | A |
|---|---|---|---|
| A(1) | 0.03571429 | 0.261217 | 0.0E+00 |

| ASPHERIC | B | C | D |
|---|---|---|---|
| A(1) | 0.0E+00 | 0.0E+00 | 0.0E+00 |

Referring back to FIGS. 4-6, at least one of the first focal length of first optical system 500 and the second focal length of second optical system 600 is a fixed focal length. However, it is contemplated that an additional optical element(s) can be positioned between either or both of the image sensor 530 and first optical system 500 and image sensor 675 and second optical system 600 that is moveable in order to affect a change in focal length, focus, or both. This can be accomplished using conventional techniques for moving one or more optical elements. Alternatively, one or both of image sensor 530 and second image sensor 675 can be moveable along its associated optical path to affect a change in focus. Movement of the image sensor(s) is accomplished using conventional techniques. In another alternative embodiment, first optical system 500 or second optical system 600 can be moved relative to their respective image sensors 530 and 675 to affect a change in focus. Again, movement is accomplished using conventional techniques.

A controller can be provided and configured to perform a digital zooming function using both the images produced by first optical system 500 and second optical system 600 of dual focal length lens system 400. Digital zooming can be accomplished us techniques like the one described in U.S. patent application Ser. No. 11/461,574 filed Aug. 1, 2006, Border et al., the disclosure of which is incorporated by reference herein.

Figure 7:
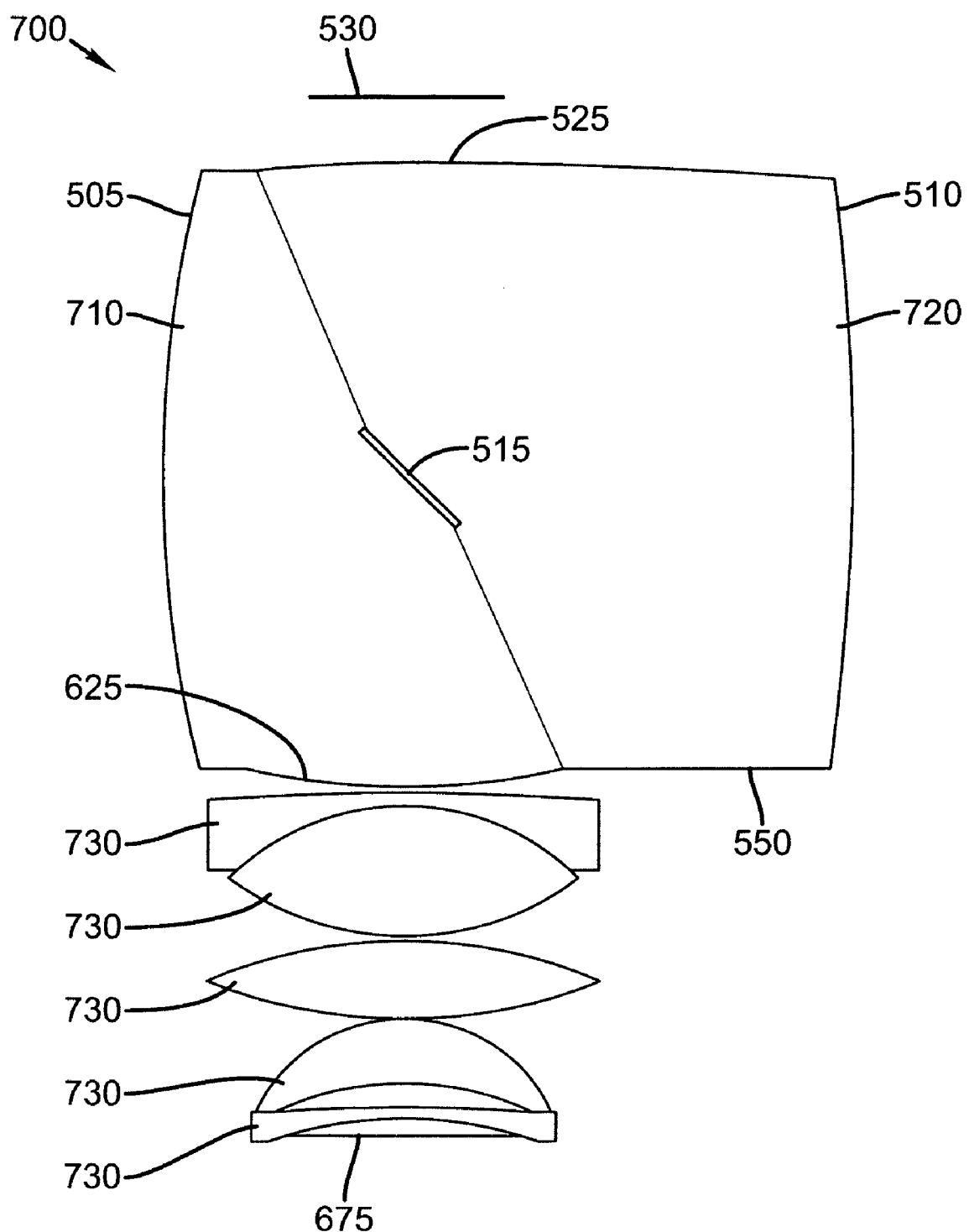
FIG. 7 is a schematic drawing showing an example implementation of the second example embodiment of the invention.

Referring to FIG. 7 and back to FIGS. 5 and 6, an example implementation 700 of dual focal length lens system 400 is shown. Optical structure 550 is a solid material element that includes two pieces 710, 720 cemented together around intermediate optical element 515. Suitable materials include low dispersion materials like acrylic plastics, cyclo olefin polymers (cop), for example, Zeonex, which is commercially available from the Zeon Corporation, Tokyo, Japan. Intermediate element 515 (and reflective surface 520), surface 525, and the object side surface 505 and the image side surface 510 of optical structure 550 of first optical system 500 make up portions of the same optical element. Additionally, this optical element also includes reflective surface 620 of intermediate element 515 and surface 625 of second optical system 600. In FIG. 7, optical elements 730 are the same as those optical lenses described with reference to FIG. 6. Image sensors 530 and 675 are also shown.

Optical systems that use reflective and refractive optics to create optical systems including two separate imaging systems sharing a common optical axis can be used in many applications. By sharing a common optical axis, the two separate imaging systems can be made to provide images without parallax differences. Optical systems like those described above are particularly well suited for compact imaging systems. The reflective optics essentially fold the optical system onto itself, thereby reducing the overall length of the optical system. Configuring the optical system to share at least a portion of a common optical axis also reduces physical space requirements and decreases the complexity of the optical system when compared to optical systems that do not share a common optical axis.

The invention has been described in detail with particular reference to certain preferred embodiments thereof, but it will be understood that variations and modifications can be effected within the scope of the invention.

PARTS LIST 100 dual focal length lens system
105 refractive surface
110 refractive surface
115 outer annular region (first refractive surface portion)
120 central region (second refractive surface portion)
125 optical axis or path
130 image sensor
135 image sensor
140 refractive element
200 first optical system
205 optical structure
210 object side surface
215 image side surface
220 refractive surface portion
225 reflective surface portion
230 refractive surface portion
235 reflective surface portion
240 refractive optical element
245 refractive surface
250 refractive surface
255 lenses
260 refractive surface
265 refractive surface
270 refractive surface
275 refractive surface
280 refractive surface
285 refractive surface
290 aperture
300 second optical system
310 piece
320 piece
330 object side surface
350 light blocking surface
360 optical system implementation
400 dual focal length lens system
410 optical axis
500 first optical system
505 object side surface
510 image side surface
515 intermediate optical element
520 first reflective surface
525 refractive surface
530 image sensor
550 optical structure
600 second optical system
620 second reflective surface
625 refractive surface
630 refractive surface
635 refractive surface
640 refractive surface
645 refractive surface
650 refractive surface
655 refractive surface
660 refractive surface
665 refractive surface
670 refractive surface
675 image sensor
700 implementation
710 piece
720 piece
730 optical elements

The invention claimed is:

1. A dual focal length optical system comprising:
a first optical system positioned along an optical path, the first optical system including an optical structure having an object side surface and an image side surface, the first optical system also including a first reflective surface of an intermediate reflective element located between the object side surface and the image side surface of the optical structure as viewed along the optical path, the first optical system having a first focal length; and a second optical system sharing a portion of the same optical path and including a second reflective surface of the same intermediate reflective element as that of the first optical system, the second optical system having a second focal length, the first focal length of the first optical system being longer than the second focal length of the second optical system.

2. The system of claim 1, the image side surface of the optical structure of the first optical system being a first image side surface of the optical structure, the second optical system including the object side surface of the optical structure and a second surface of the optical structure that is not shared by the first optical system.

3. The system of claim 1, wherein the object side surface of the optical structure includes an aspheric surface.

4. The system of claim 1, wherein the image side surface of the optical structure includes optical power.

5. The system of claim 1, wherein the image side surface of the optical structure includes an aspheric surface.

6. The system as claimed in claim 1, wherein the intermediate reflective element is fixed in position.

7. A dual focal length optical system comprising:
a first optical system positioned along an optical path, the first optical system including an optical structure having an object side surface and an image side surface, the first optical system also including a first surface of an intermediate reflective element located between the object side surface and the image side surface of the optical structure as viewed along the optical path, the first optical system having a first focal length;
a second optical system sharing a portion of the same optical path and including a second surface of the same intermediate reflective element as that of the first optical system, the second optical system having a second focal length, the first focal length of the first optical system being longer than the second focal length of the second optical system; and
a second intermediate element associated with the first optical system, the second intermediate element including an optical surface positioned along a portion of the optical path that is not shared by the second optical system.

8. The system of claim 7, wherein the second intermediate element includes an aspheric surface.

9. The system of claim 7, wherein the first intermediate element, the second intermediate element, and the object side surface and the image side surface of the optical structure of the first optical system make up portions of the same optical element.

10. The system of claim 9, wherein the optical element is a solid material element.

11. The system of claim 10, wherein the solid material element comprises two elements cemented together.

12. The system of claim 9, the image side surface of the optical structure of the first optical system being a first image side surface of the optical structure, the second optical system including the object side surface of the optical structure and a second surface of the optical structure that is not shared by the first optical system.

13. A dual focal length optical system comprising:
a first optical system positioned along an optical path, the first optical system including an optical structure having an object side surface and an image side surface, the first optical system also including a first surface of an intermediate reflective element located between the object side surface and the image side surface of the optical structure as viewed along the optical path, the first optical system having a first focal length; and
a second optical system sharing a portion of the same optical path and including a second surface of the same intermediate reflective element as that of the first optical system, the second optical system having a second focal length, the first focal length of the first optical system being longer than the second focal length of the second optical system;
wherein the image side surface of the optical structure of the first optical system being a first image side surface of the optical structure, the second optical system including the object side surface of the optical structure and a second surface of the optical structure that is not shared by the first optical system; and
wherein the second surface of the optical structure includes optical power.

14. The system of claim 13, wherein the second surface of the optical structure includes an aspheric surface.

15. A dual focal length optical system comprising:
a first optical system positioned along an optical path, the first optical system including an optical structure having an object side surface and an image side surface, the first optical system also including a first surface of an intermediate reflective element located between the object side surface and the image side surface of the optical structure as viewed along the optical path, the first optical system having a first focal length;
a second optical system sharing a portion of the same optical path and including a second surface of the same intermediate reflective element as that of the first optical system, the second optical system having a second focal length, the first focal length of the first optical system being longer than the second focal length of the second optical system;
a first image sensor associated with the first optical system; and
a second image sensor associated with the second optical system.

16. The system of claim 15, further comprising:
an additional optical element positioned between either or both of the first image sensor and the first optical system and the second image sensor and the second optical system.

17. The system of claim 16, wherein the additional optical element is moveably positioned in order to affect a change in focal length, focus, or both.

18. The system of claim 15, wherein one or both of the first image sensor and the second image sensor is moveable along its associated optical path to affect a change in focus.

19. The system of claim 15, further comprising:
a controller configured to perform a digital zooming function using both the images produced by the first optical system and the second optical system.

20. The system of claim 15, wherein at least one of the first focal length of the first optical system and the second focal length of the second optical system is a fixed focal length.

* * * * *